United States Patent Office 2,958,932

Patented Nov. 8, 1960

2,958,932

MANUFACTURE OF CADMIUM SULFIDE PHOTOCONDUCTIVE CELL BODIES

Paul J. Goercke, Freiburg, Germany, assignor to Centre National d'Etudes des Telecommunications, Issy les Moulineaux, Seine, France, a body corporate of France No Drawing. Filed May 9, 1958, Ser. No. 734,114

2 Claims. (Cl. 29—155.71)

This application is a continuation-in-part of the application for U.S. patent, S.N. 281,050 filed in the name of Paul J. Goercke on April 7, 1952, now abandoned, and entitled Process for Manufacturing Activated Semi-Conductive Substances.

The present invention relates to the manufacture of cadmium sulphide photoconductive cells which may contain a proportion of cadmium selenide, and in particular is concerned with the activation for photoconductivity purpose of nonactivated cadmium sulphide cell bodies which may be either in the form of monocrystals or of deposited layers.

The cells which the present invention aims at providing are activated cadmium sulphide and cadmium selenide cells, the percentage of cadmium selenide being, in weight, of 50% at the most. Neither SeCd nor Se play the part of an activator. The action of SeCd is to stabilize the activated cadmium sulphide cells and to give them characteristics irrespective of time. Hereinafter, whenever reference is made to SCd, it will be understood that this body can contain up to 50% of SeCd.

As is well known, the photoelectric properties of such semiconductor materials as cadmium sulphide, notably those offering photoconductivity characteristics, are greatly influenced by the presence of certain so-called impurities, or activators. These activators introduce centres of disturbance into the crystal lattice of the cadmium sulphide and thereby alter its normal stoichiometric composition. By the choice of activators and their concentration—normally in the range of a hundredth of a percent to a few percent—it is possible to control the photoconductive properties of the treated cadmium sulphide over a wide range.

Great difficulty has been encountered in the past in achieving uniform and predictable results when activating nonactivated bodies of cadmium sulphide as monocrystals or deposited layers for use in photoconductive cells. Known methods have not achieved, at least in a period of time which would be suitable for commercial production, a homogeneous distribution of impurity atoms throughout the treated body, and specific degrees of activation have not been capable of being attained in a reliable and repeatable manner.

It has been tried, in the past, to produce cadmium sulphide photoluminescent cells activated with silver by the process of thermal diffusion in the gaseous phase. To be more precise, a powder of activated cadmium sulphide is prepared. SCd monocrystals are placed in a capsule above the activated powder and not in contact with that powder. The powder and the monocrystals are then heated towards the 600° C. range in an air-filled enclosure which is hermetically sealed. After a period of approximately 24 hours, activated monocrystals are obtained, which are luminescent when they are excited by Wood light or by α rays.

An attempt has been made to use this process for the fabrication of photoconductive cells activated by different metals, but the results have proved completely negative: whereas a satisfactory photoconductive cell should offer a ratio of at least 1000 between its dark resistance and its resistance under an illumination of 10 lux produced by a tungsten filament source (the present invention provides the possibility of obtaining ratio figures in the order of 100,000), the ratio obtained by the process of the gaseous diffusion of activators is 10 at the most.

While it is difficult to ascertain the exact reasons for the inefficiency of the process of activator gaseous diffusion for the production of photoconductive cells, it may be estimated that:

(*i*) Semi-conductor luminescence occurs at much lower activation percentages than is the case for photoconductivity. Photoluminescence occurs at activation percentages as low as $10^{-8}$, whereas SCd conductivity occurs only at percentages of $10^{-4}$ and above. Now, it is difficult to obtain high activation percentages by the process of gaseous phase thermal diffusion because of the very low metal vapour pressures at activation temperature. For instance, at 600° C., the silver vapour pressure is in the range of $10^{-7}$ mm. and the evaporation of an appreciable quantity of silver requires a very long time to achieve.

(*ii*) There is no equilibrium between the percentage of powder activation and that of the monocrystals to be activated save, perhaps, after a period of time in the order of several months. Consequently, the activation percentage of monocrystals is controlled by many factors such as process temperature, process time, the relative arrangement of the powder activator and of the crystal, the area of powder activator in contact with the gaseous phase, and crystal dimensions. If certain parts of the crystal are not activated, the SCd therein retains its intrinsic resistivity and all photoconductivity effects disappear.

(*iii*) In the case where several metals are utilized for the activation process, their vapour pressures are generally different and a given activation would assume that a powder has been prepared in which the activators are, relatively to their desired proportions, in reverse proportion to their vapour pressures, a condition that implies very great difficulties.

An object of the invention is to provide a process for manufacturing activated cadmium sulphide cell bodies having uniform and repeatable characteristics.

A further object of the invention is to provide a process for the activation of cadmium sulphide photoconductive cell bodies which provides a homogeneous distribution of the atoms of a plurality of activating materials throughout the body in precisely controllable concentrations.

A further object of the invention is to provide a process for the activation of cadmium sulphide photoconductive cell bodies which is not only precise but is also rapid and simple to employ, the treatment lasting, in general, for a period of only two to three hours.

A further object of the invention is to provide a process for the activation of cadmium sulphide monocrystals or deposited layers which does not alter the physical form of the treated bodies.

A further object of the invention is to provide cadmium sulphide photoconductive cells having a ratio of at least 100,000 between their dark resistance and their resistance under an illumination of 10 lux.

The achievement of the above objects and further advantages of the invention will be seen from the following description of its operation and the disclosed embodiments illustrative thereof.

The invention employs the phenomenon of thermal diffusion in the solid phase. A pulverulent mixture of cadmium sulphide and activators having a fineness of grain of approximately 50μ is made up, the proportion of the constituents being essentially the same as those required in the treated body of cadmium sulphide. The body to be treated, which may be a monocrystal or a layer of cadmium sulphide sprayed or deposited upon a support such as a glass, quartz or steatite wafer, is then completely immersed in the mixture. The powder shrouding the cell bodies is then compacted so that it is pressed in very intimate contact with said bodies. The applied pressure must be of the order of several tens of kg./cm.$^2$, for instance 50 kg./cm.$^2$. This pressure is not critical. A press is not necessary and the desired pressure can be obtained by hand or with a pestle. The mass of the mixture used is very much greater, about 100 times that of the body to be treated, so that, after treatment, activation being homogeneous throughout the powder and the cell bodies, this activation is very much the same as that of the powder at the start. The pulverulent mixture and the cadmium sulphide bodies, in intimate contact, are heated to a temperature below that involving a change in the external crystalline form of the cadmium sulphide, and held at that temperature until the activators are homogeneously distributed throughout both the mixture and the cadmium sulphide body by the thermal diffusion in the solid phase. When this distribution has been attained, due to the very great difference in mass between the mixture and the cadmium sulphide body, the proportion of activators to cadmium sulphide in the treated body is, for all practical purposes—i.e. within 1%—the same as that in the treating mixture.

It is pointed out that thermal diffusion in the solid phase gives photoconductive cells which will have a precisely defined composition of CdS and activators whereas thermal diffusion in the vapour phase as proposed in the prior art gives photoconductive cells which have a composition different from that of the heated mixture due to the various vapour pressures of the constituents. It is known that even the stoichiometric composition of CdS itself is not preserved in this gaseous thermal process.

The cadmium sulphide body which is to be treated may be prepared by any of the known techniques. For instance, crystals of cadmium sulphide may be prepared according to the method of Frerichs as described under the title "The Photoconductivity of Incomplete Phosphors" in the Physical Review, October 1, 1947, 72, No. 7, pages 594–601. Or a layer of cadmium sulphide may be sprayed upon a surface, say of glass, or deposited by condensation of the vapour from heated cadmium sulphide or cadmium vapour acted upon by hydrogen sulphide gas.

The pulverulent activating mixture may be prepared in accordance with methods usually employed in the making of powdered activated phosphors such as are used for cathode ray tube screens. As is well known the precise steps in preparing mixtures of this kind vary in accordance with the type of material to be activated and the type and concentration of activating elements. In general, the various materials of the mixture are assembled in the desired proportions and thoroughly ground up together in a ball mill during several hours. The resulting powder is then subjected to a heat treatment which acts to disperse the activators more thoroughly throughout the mixture. With this method, a sintered cake is obtained in which the activators are distributed in homogeneous manner. However, the degree of homogeneity obtained with a single grinding and heating treatment is not sufficient and, for that reason, the process of heating and grinding is repeated several times, for instance three times.

As applied to the preparation of cadmium sulphide, and depending upon the photoelectric characteristics desired, a number of different activators and combinations thereof may be employed. Some of these activators are gold, titanium, indium, mercury, gallium, thallium, aluminium, copper, silver, nickel, lead and cadmium itself, in its solid state. In an article entitled "Activated Cadmium Sulphide Photoelectric Cells" which appeared in "Annales des Telecommunications," volume 6, No. 11, for November 1951, pages 325 to 330, applicant has published curves giving the spectral sensitivity, dark resistance, the resistance for an illumination of 20 lux, and noise level of cadmium sulphide activated by copper, silver etc.

As an illustration, if the maximum sensitivity is required to be at 0.51$\mu$, an excess of cadmium atoms in the crystal lattice of the cadmium sulphide is employed. Silver as an activator produces a spectral sensitivity maximum at 0.55$\mu$, while copper activators result in a peak at 0.6$\mu$. By simultaneously employing different activators such as cadmium, silver, copper, nickel etc., the spectral distribution of the response may be influenced within wide limits.

After treatment, the treated cells practically detach themselves from the mass of the cake obtained. The cake is carefully fractioned. The cells are collected and washed in distilled water.

The temperature of heating is determined by several factors. As the physical shape of the cadmium sulphide crystal must not be changed, an upper limit of 600° C. is more or less arbitrarily fixed. The type of activator may determine the lower limit due to the temperature dependence of the diffusion coefficient; for instance, penetration by copper atoms occurs at the level of about 400° C. whereas for some other activators, such as manganese and lead, temperatures up to 600° C. may be required.

A consideration in the employment of the method of the invention is that, in the case of numerous activators, such, for instance, as copper, a high concentration thereof in the crystalline lattice prevents the entry of other activators. Since, as noted above, penetration by copper occurs at 400° C., when activating mixtures containing copper together with other elements requiring higher temperatures are employed, there will be a tendency for the copper to enter the crystal lattice first as heat is applied and thus to prevent the other elements in the activating mixture from entering. In such cases, those elements which are difficult to introduce into the body of the cadmium sulphide may be prepared in a first pulverulent mixture, and the cadmium sulphide body treated therewith according to the invention at a temperature which approaches 600° C. After this first treatment, an activating mixture containing copper may then be employed in a second treatment at a lower temperature such as 400° C.

The duration of the heat treatment is a function of the volume of the treated body, of the type of activator, of the temperature employed, and of the degree of activation desired. While applicant has found that a duration of two to three hours was appropriate for his particular requirements, different conditions might necessitate that, as is usual in the field of activation of semiconductive materials, empirical relations be established by trial. In fact, the duration of the process does not exceed five hours.

The heat treatment may be applied in an inert atmosphere such as nitrogen, or in air, precautions being taken to prevent the oxidation of the activating powder and cell bodies.

After the heat treatment, the cell bodies are stabilized by applying for a period of about 48 hours, under a known illumination, the highest current that they can bear, i.e. a current corresponding to a power dissipated of about 1 milliwatt per mm.$^2$ of sensitive area.

The following representative examples illustrate in some degree the scope of the invention. It will be seen that cadmium sulphide cell bodies prepared according to the invention exhibit photosensitivities which are several orders of magnitude greater than those achieved by the known art.

The activating mixture was prepared from extra pure commercial pulverulent cadmium sulphide such as is employed for the manufacture of luminescent tubes. The grinding and heating process above mentioned was repeated two or three times, the heating being between 600° C. and 650° C. for three hours each time. Where copper is employed as one of the activators, the two-step activating treatment as outlined above was employed. In the following examples, the electric field applied to the cell is assumed to be 100 volts per cm.

*Example I*

For photocell applications to the reproduction of photographically recorded sound on film. Low noise level and good high frequency response are pre-requisites.

Characteristics:

| | |
|---|---|
| Dark resistance | $>10^{10}$ ohms. |
| Resistance for a 10 lux illumination | 100,000 ohms. |
| Inertia | Time constant<1 millisecond. |
| Sensitivity | 1 amp. per lumen. |

Composition of activating mixture (the percentage being by weight):

| | Percent |
|---|---|
| CdS | 99.10 |
| $CdCl_2$ | 0.80 |
| CuS | 0.04 |
| $NiCl_2$ | 0.06 |

Percentage of activators 0.9%.

The copper sulphite in the above mixture may be replaced by copper chloride containing the same amount of copper atoms.

The cell is prepared in the following manner: the constituent elements are mixed in a porcelain ball mill and ground, in dry air, for a period of about one hour, the duration of the grinding being non-critical. The essential requirement is to obtain a powder having a maximum grain diameter of the order of 100$\mu$. The composite powder obtained in this manner is placed in a steatite crucible where it forms a first powder. It is then compacted by hand in a series of sharp pestle strokes. The pressure thus applied can be assessed to be within the range of 10 kg./cm.$^2$ to 50 kg./cm.$^2$. The compacted powder is then covered with a second layer of powder already employed in a previous preparation. This layer will be compacted in the same manner. This second layer does not enter into the reaction process and its purpose is to prevent the first layer from oxidizing. It is called the protective layer. The preparation is then heated to a temperature of 600° C. for a period of three hours. After cooling, the cake produced by the first and second layers are withdrawn from the crucible and is separated into two cakes corresponding to said first and second layers. The two cakes come part easily because they were compacted separately. Each cake is then ground separately. The cake obtained from the first layer employed for the reaction is finely ground (grain diameters to be 100$\mu$ maximum). The second cake can be less finely ground. As for the previous operation, the powder obtained from the grinding of the first cake is placed at the bottom of the steatite crucible and the powder obtained from the grinding of the second cake is laid over the first layer, again to prevent oxidation. The preparation is heated to the same temperature and during the same period of time as in the first stage of the process. Grinding and heating are again repeated so that, ultimately, the powder of the preparation has been ground and heated three times, being protected against oxidation during each successive stage of the process.

The thrice ground powder is placed again in the crucible and the cells to be acttivated are immersed in the powder. Care is taken that the mass of the powder be much higher in proportion with that of the cells to be activated, for instance 100 times higher. The mixture is again compacted at the pressure indicated above and topped with a protective layer of powder also compacted at the same pressure. The preparation is heated in air to 600° C. during two hours. After cooling, the two cakes are separated and the cake containing the cells is carefully fractioned. Experience shows that the cells are easily loosened out. The cells are washed in hot distilled water (for instance, 50° C.). The electrodes are painted with a metallic paint over one of the sides of the cell, namely that side which is to be illuminated. Both the coating of paint and the sensitive layer are coated with silicon varnish.

*Example II*

For a photocell capable of direct energizing of relays:

Characteristics:

| | |
|---|---|
| Dark resistance | About $10^8$ ohms. |
| Inertia | Time constant between 10 and 100 milliseconds. |
| Sensitivity | 20 amps. per lumen. |

Composition of activating mixture (the percentage being by weight):

| | Percent |
|---|---|
| CdS | 96.52 |
| CdSe | 3.00 |
| $CdCl_2$ | 0.25 |
| CuS | 0.12 |
| HgCl | 0.06 |
| AuCl | 0.05 |

Percentage of activators 0.48%.

*Example III*

Characteristics:

| | |
|---|---|
| Dark resistance | About $10^9$ ohms. |
| Inertia | Time constant between 1 and 10 milliseconds. |
| Sensitivity | About 10 amps. per lumen. |

Composition of activating mixture (the percentage being by weight):

| | Percent |
|---|---|
| CdS | 98.07 |
| CdSe | 1.50 |
| $CdCl_2$ | 0.25 |
| CuS | 0.15 |
| AuCl | 0.01 |
| $NiCl_2$ | 0.02 |

Percentage of activators 0.43%.

*Example IV*

Characteristics:

| | |
|---|---|
| Dark resistance | About $10^{11}$ ohms. |
| Inertia | Time constant <0.1 millisecond. |
| Sensitivity | About 1 amp. per lumen. |

Composition of activating mixture (the percentage being by weight:

| | Percent |
|---|---|
| CdS | 98.19 |
| CdSe | 1.20 |
| CuCl | 0.60 |
| $NiCl_2$ | 0.01 |

Percentage of activators 0.61%.

*Example V*

Characteristics:

| | |
|---|---|
| Dark resistance | $<10^8$ ohms. |
| Inertia | Time constant between 10 and 100 milliseconds. |
| Sensitivity | Greater than 20 amps. per lumen in ultra-violet and blue; less than 0.01 amp. per lumen in red and infra-red. |

Composition of activating mixture (the percentage being by weight):

| | Percent |
|---|---|
| CdS | 99.18 |
| TlCl | 0.80 |
| $In_2S_3$ | 0.02 |

Percentage of activators 0.82%.

The cell bodies of Examples II to V can be prepared by the same method as that of Example I. An optional method may be the following:

The sulphides (CdS, CuS, $In_2S_3$ . . . ) and eventually the selenides (CdSe) are mixed in the form of powders, and the chlorides ($CdCl_2$, $CuCl_2$, $NiCl_2$, HgCl, AuCl . . . ) in the form of aqueous solutions at a concentration of 2% (for example, in Example II, there is taken 125 grs. of a $CdCl_2$ solution at this concentration to obtain 2.5 grs. of $CdCl_2$, if one kilogram of activating powder is to be prepared).

The mixture in aqueous medium is then crushed in a ball-mill during about 4 hours and baked at 650° C. for about 3 hours. The sintered piece thus obtained is ground during 4 hours until the grains have diameters between 50 and 100$\mu$. The grinding and baking operations are repeated twice.

If cell bodies of a total weight of 10 grs. are to be treated, they are placed in a crucible of cast silica with approximately 1000 grs. of activated powder, said powder entirely covering the cell bodies. When Cu alone is involved as activator, the crucible is heated during 2 hours at 400° C. In other cases, the crucible is heated at 600° C. during a time comprised between 2 and 3 hours. To prevent the activating powder from being oxidised, a protective pulverulent layer may be laid over the activating powder, or, alternatively, the baking process may take place in an atmosphere of nitrogen.

The above examples indicate the results capable of being achieved by the method of the invention. However, it will be realized that these embodiments are illustrative only, and that the method of the invention is applicable generally to the activation of cadmium sulphide photoconductive cell bodies without limitation as to the precise composition of the activating materials.

What is claimed is:

1. A process for the activation of cadmium sulphide photoconductive cell body by the introduction within the crystal lattice structure thereof of metallic activator atoms in concentrations of from a hundredth of a percent to one percent comprising, preparing a pulverulent mixture of cadmium sulphide and said metallic activators, said metallic activators being homogeneously dispersed in said mixture in a concentration equal to that of the required concentration of said metallic activators in the treated cell body and the mass of said mixture being about one-hundred times the mass of said cell body, immersing said cell body in said pulverulent mixture, applying to said mixture with said cell body immersed therein a pressure of from ten to several tens of kilograms per square centimeter, heating said immersed body and mixture to a temperature within the range of 400° C. to 600° C., maintaining said temperature until by thermal diffusion equal and homogeneous distribution of activator atoms throughout said pulverulent mixture and said cell body is attained, removing said cell body from said pulverulent mixture, painting electrodes on said cell body, and passing between said electrodes for about forty-eight hours while said cell body is under illumination an electric current sufficient to dissipate in said cell body a power of about one milliwatt per square millimeter of sensitive area of said cell.

2. A process for the activation of a cadmium sulfide photoconductive cell body by the introduction within the crystal lattice structure thereof of activator atoms of at least two metals in concentrations of from a hundredth of a percent to one percent, atoms of one of said metals being capable of being introduced within said lattice structure at a lower temperature than atoms of the other of said metals, atoms of said one metal when introduced tending to prevent the entrance into said lattice structure of atoms of the other of said metals, said process comprising the steps of preparing a first pulverulent mixture of cadmium sulphide and said other metal in powdered form, said other metal being homogeneously dispersed in said first mixture in a concentration equal to that of the required concentration of said other metal in the treated cell body and the mass of said first mixture being about one hundred times the mass of said cell body, immersing said cell body in said first pulverulent mixture, applying to said first mixture with said cell body immersed therein a pressure of from ten to several tens of kilograms per square centimeter, heating said immersed body and first mixture to a temperature approaching 660° C., removing said cell body from said first mixture, preparing a second pulverulent mixture of cadmium sulphide and of said one metal in powdered form, said one metal being homogeneously dispersed in said second mixture in a concentration equal to that of the required concentration of said one metal in the treated cell body, immersing said cell body in said second pulverulent mixture, applying to said second mixture with said cell body therein a pressure of from ten to several tens of kilograms per square centimeter, heating said immersed body and said second mixture to a temperature between 400° C. and 600° C. and no greater than is necessary to accomplish thermal diffusion in the solid phase of atoms of said one metal into said cell body, removing said cell body from said last-named pulverulent mixture, painting electrodes on said cell body, and passing between said electrodes for about forty-eight hours while said cell body is under illumination an electric current sufficient to dissipate in said cell body a power of about one milliwatt per square millimeter of sensitive area of said cell.

References Cited in the file of this patent

UNITED STATES PATENTS

| | | |
|---|---|---|
| 2,736,848 | Rose | Feb. 28, 1956 |
| 2,841,730 | Piper | July 1, 1958 |
| 2,876,184 | Geppert | Mar. 3, 1959 |
| 2,879,182 | Pakswer et al. | Mar. 24, 1959 |
| 2,915,687 | Allison | Dec. 1, 1959 |

FOREIGN PATENTS

| | | |
|---|---|---|
| 695,936 | Great Britain | Aug. 19, 1953 |

OTHER REFERENCES

Grillot: "Academie des Sciences Comptes Rendus," 230, 1950, pages 1280–2.

UNITED STATES PATENT OFFICE

CERTIFICATION OF CORRECTION

Patent No. 2,958,932 November 8, 1960

Paul J. Goercke

It is hereby certified that error appears in the above numbered patent requiring correction and that the said Letters Patent should read as corrected below.

Column 5, line 53, for "part", read -- apart --; column 8, line 29, for "660° C." read -- 600° C. --.

Signed and sealed this 9th day of May 1961.

(SEAL)
Attest:

ERNEST W. SWIDER
Attesting Officer

DAVID L. LADD
Commissioner of Patents